United States Patent [19]
Heiniger

[11] Patent Number: 5,685,336
[45] Date of Patent: Nov. 11, 1997

[54] DEVICE FOR MONITORING THE VALVE LIFT OF A DIAPHRAGM VALVE

[75] Inventor: Martin Heiniger, Schaffhausen, Switzerland

[73] Assignee: Georg Fischer Rohrleitungssysteme AG, Switzerland

[21] Appl. No.: 531,761

[22] Filed: Sep. 21, 1995

[30] Foreign Application Priority Data

Sep. 21, 1994 [CH] Switzerland .................. 02 862/94

[51] Int. Cl.$^6$ .................................................. F16K 37/00
[52] U.S. Cl. ........................... 137/554; 137/559; 200/61.86
[58] Field of Search ........................... 137/554, 559; 200/61.86

[56] References Cited

U.S. PATENT DOCUMENTS

| | | | |
|---|---|---|---|
| 2,973,009 | 2/1961 | Kazyaka | 200/61.86 X |
| 3,189,700 | 6/1965 | Eidson | 200/61.86 |
| 3,367,365 | 2/1968 | Stevens | 137/554 X |
| 3,390,943 | 7/1968 | Myers | 137/554 X |
| 3,416,566 | 12/1968 | Anderson | 137/554 |
| 3,789,875 | 2/1974 | McGee | 137/554 X |
| 3,949,963 | 4/1976 | Aoki | 137/554 X |
| 4,353,390 | 10/1982 | Karpenko | 137/554 X |
| 4,858,937 | 8/1989 | Fairlie-Clarke et al. | 137/554 X |

*Primary Examiner*—John Rivell
*Attorney, Agent, or Firm*—Gifford, Krass, Groh, Sprinkle, Patmore, Anderson & Citkowski, P.C.

[57] ABSTRACT

Device for monitoring the valve lift of a pneumatically or hydraulically driven valve, the valve body of which is actuated by a pressure spindle (16), specifically a diaphragm valve where a drive spindle (20) and pressure spindle (16) are effectively connected. Two trip cams (38, 40) separated by the distance (a) are mounted on the drive spindle (20) to activate two limit switches (34,35) that act as position indicators for the two valve positions, whereby one trip cam (38, 40) is assigned to one limit switch (34, 35). The automatic positioning of the trip cams (38, 40) during the initial actuation of the valve is accomplished by a crossbar (36) that acts as a driver and is located between trip cams (38, 40). The trip cams (38,40) are mounted on drive spindle (20) by moveable clamps.

8 Claims, 2 Drawing Sheets

DEVICE FOR MONITORING THE VALVE LIFT OF A DIAPHRAGM VALVE

The invention pertains to a device for monitoring the valve lift of a pneumatically or hydraulically driven valve, thee valve body of which is actuated by a pressure spindle, specifically a diaphragm valve where a drive spindle and pressure spindle are effectively connected and a trip cam attached to the drive spindle is used to activate two limit switches that act as position indicators for two valve positions.

The electrical position indicators of the type mentioned above are used to indicate the valve position in connection with pneumatically or hydraulically driven lift valves. The limit switches are activated in the respective end position of the valve lift, whereby an electrical signal is produced which represents the open-close position of the valve. This electrical signal, for example, can be transmitted to a control unit or a control panel.

Position indicators known to be equipped with only a single trip cam have the disadvantage in that the lift elements must be adapted to the respective valve lift by mechanical means.

In view of this the inventor has made it his duty to develop a device of the type previously described where the requisite adaptation to the valve lift can be accomplished in a simple way.

According to the invention the solution to the problem is for two trip cams, to be positioned on the drive spindle at a specific distance, each of which is assigned to one limit switch.

Special and advanced design types of the invention are subject to patent claims.

The arrangement of two trip cams, according to the invention, eliminates the need for the mechanical adjustment of the limit switches since the adaptation to the valve lift can now be accomplished by appropriately positioning the trip cams on the drive spindle. The preferred method for mounting the trip cams on the drive spindle is to clamp them so that for one they cannot be displaced by the limit switches and, for another, the position can be changed without the need to apply too much force.

A particularly practical feature of the device, according to the invention, is the crossbar between the trip cams, which acts as a driver for positioning the trip cams. This arrangement allows the trip cams to be moved into the correct working position the first time the valve is opened and closed by the trip cams. Even if the medium diaphragm must be set during storage or during the operation of the valve drive, the trip cam readjusts itself automatically to indicate the closed position of the valve.

To further enhance the functional safety of the device, the drive spindle and the pressure spindle are connected by a coupling. Ideally, the device should be designed so that it can be threaded into the cover of the valve body.

A clear plastic cover should be used to protect the position indicators from contamination. This cover can be provided with graduated marks, thus allowing the measurement of the valve lift. For practical reasons, the trip cams should be made of red plastic.

The limit switches can be designed as microswitches, inductive proximity switches or other suitable switching element. Their position in relation to the axis of the drive spindle should be symmetrically arranged and immovable.

Other advantages, features and details of the invention can be derived from the description of a preferred design example and from the schematics;

Figure 1:
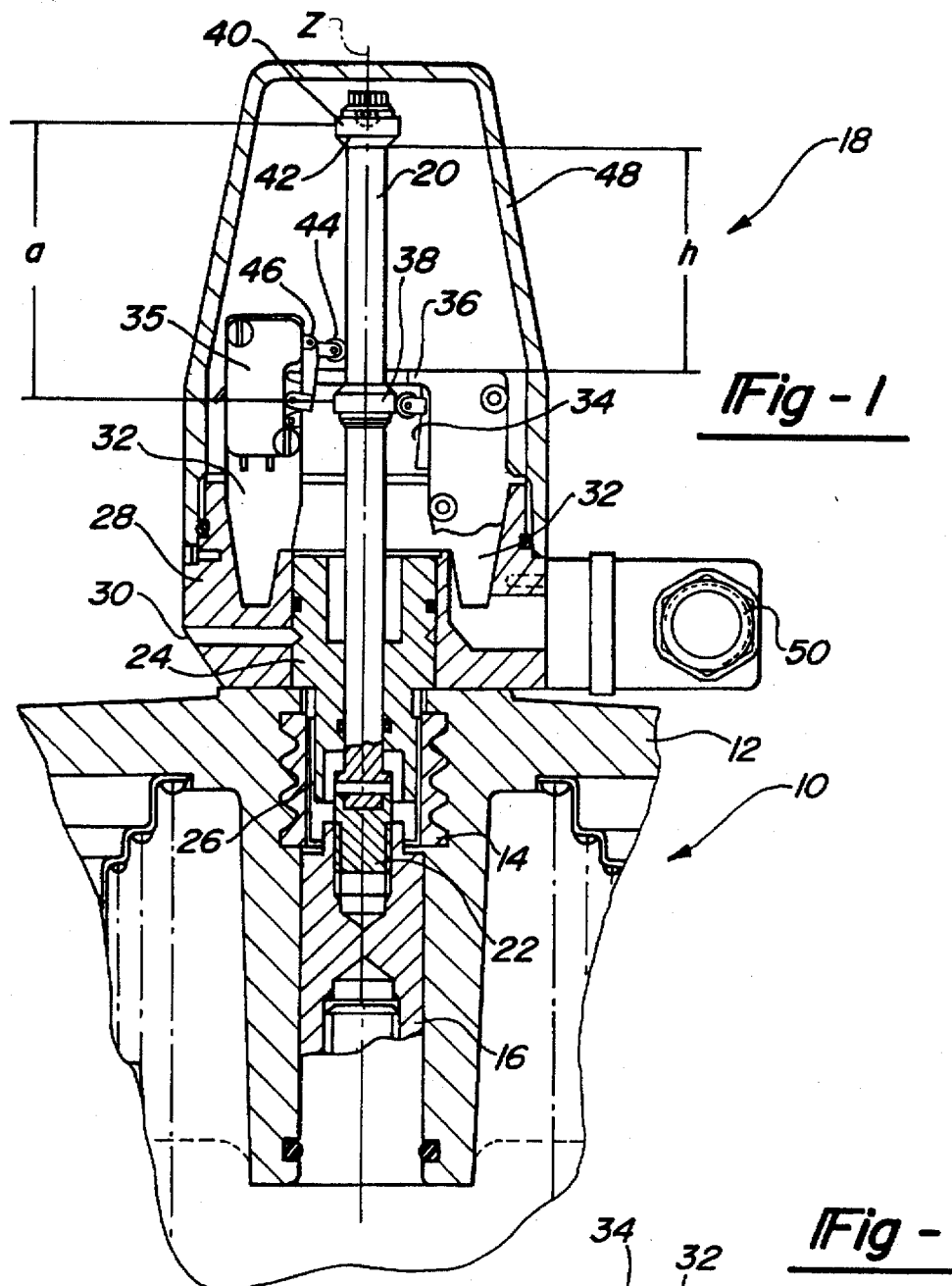
FIG. 1 shows the longitudinal section of a position indicator.

To provide a better overview, FIG. 1 shows only a portion of the valve body 10 without the details of a diaphragm valve, a valve cover 12, with a threaded bushing 14 in the center. Located on top of the valve body 10 is a position indicator 18 with a drive spindle 20, which is connected to the pressure spindle 16 by a coupling 22. The position indicator 18 is threaded into the bushing 14 by a center part with external threads. The drive spindle 20 passes through the threaded part 24 in the direction of the actuation axis z.

The threaded part 24 is overlapped by a support 28 that can be fixed with a set screw 30. Extending from the support 28 parallel to the direction of axis z are the mounting surfaces 32 to which the limit switches 34,35 are attached in a symmetrical pattern. The two mounting surfaces 32 are connected by a crossbar 36 located vertical to the direction of axis z.

Figure 2:
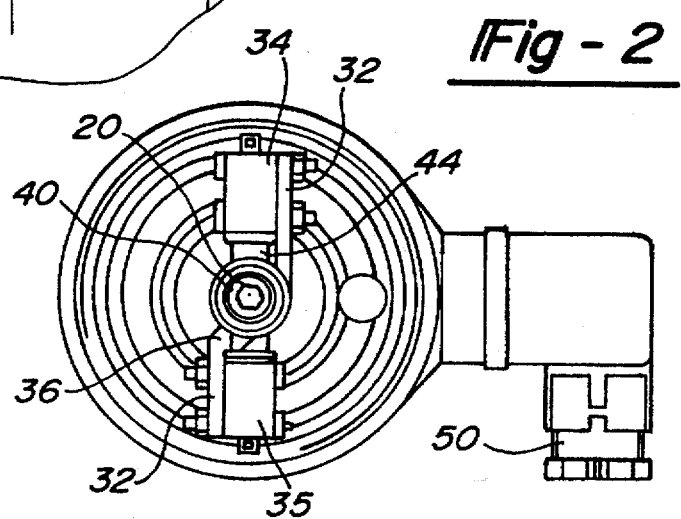
FIG. 2 shows the top view of the position indicator shown in FIG. 1 without the cover and with limit switches arranged at a 90° offset.

Two trip cams 38,40 are attached to the drive spindle by moveable clamps. After the diaphragm valve has been activated, the distance between the two trip cams is defined as distance "a". Crossbar 36 is located between the two trip cams 38, 40 and, as shown in FIG. 2, it embraces the drive spindle 20 in such a way that it acts as a driver for trip cams 38,40. Trip cam 38 controls limit switch 34, which indicates the 'open' position of the valve. Trip cam 40 controls limit switch 35, which indicates the 'closed' position of the valve. As the valve is activated, the drive rollers 44 of the limit switches 34, 35 move along the drive spindle end upon reaching the end position of the valve, are lifted onto trip cams 38, 40 over the chamfered surface 42. This process causes a trip pin 46 to engage and generate an electrical signal.

The position indicator 18 is protected against contamination by a clear plastic cover 48 which extends over the support 28. A channel with a connector 50 is provided on the side of support 28 to facilitate the removal of the electrical cable from the position indicator 18.

Figures 3A, 3B, 3C:
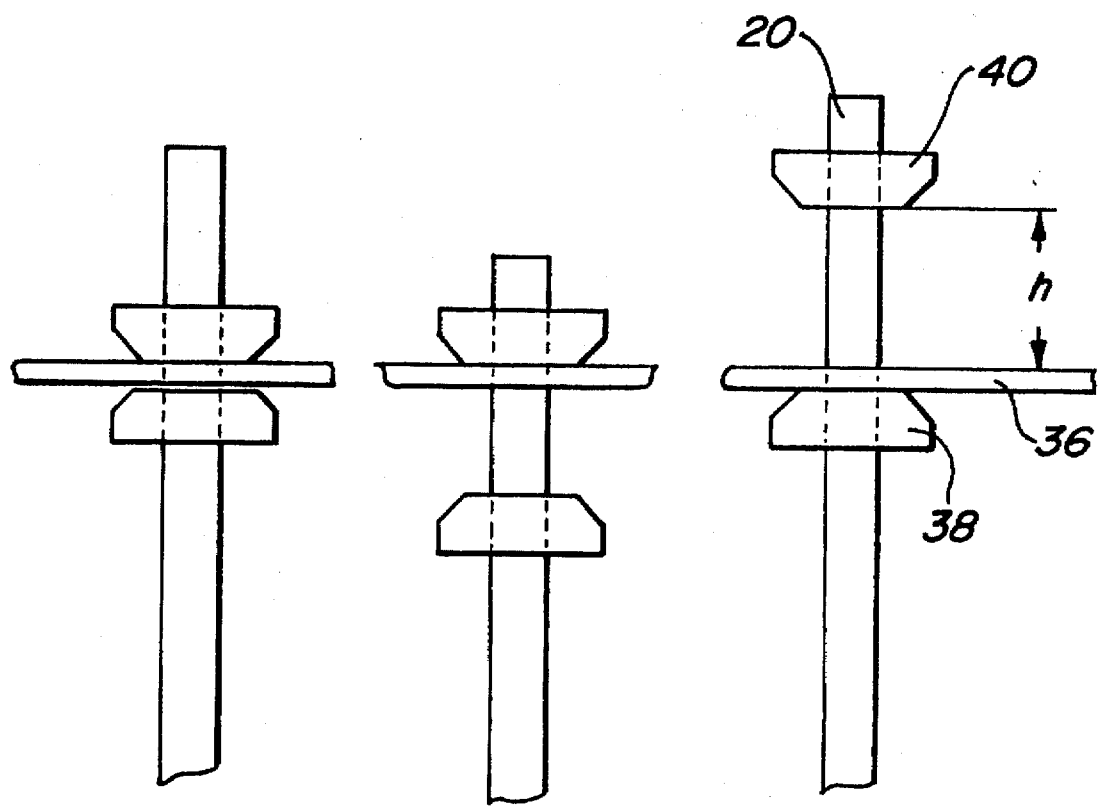
FIG. 3a–c shows the automatic positioning of the trip cam after the initial valve activation.

FIGS. 3a–c depict the positions of the two trip cams 38,40 on the drive spindle 20 as the valve is opened and closed for the first time.

FIG. 3a shows the starting position after the position indicator 18 has been threaded onto the valve body 10. The two trip cams 38, 40 are manually pushed against the crossbar 36.

FIG. 3b shows the valve after it has been closed for the first time. Due to the driver action of the crossbar 36, trip cam 40 has moved into its final position during the closing of the valve.

FIG. 3c shows the position of trip cams 38, 40 after the valve has been moved into the open position for the first time. During the movement of the valve at maximum lift h, the other trip cam 38 has now also been moved into its final position.

FIGS. 3a through 3c clearly indicate the automatic adaptation of trip cams 38, 40 to the valve lift.

I claim:

1. A device for monitoring the valve lift of a pneumatically or hydraulically driven valve having a valve body which is actuated by a pressure spindle, specifically a diaphragm valve, where a drive spindle and a pressure spindle coaxial with said drive spindle are connected by a connector, and a trip cam attached to the drive spindle is used to activate two limit switches that act as position indicators for the valve positions with the distinguishing feature that two trip cams are movably mounted on the drive spindle and are moved to a desired spaced apart position by a crossbar that is located between said trip cams and which acts as a driver, and that one trip cam is assigned to each limit switch.

2. A device according to claim 1 with the distinguishing feature that said device can be threaded into a cover of said valve body.

3. A device according to claim 1 with the distinguishing feature that a part of the drive spindle which carries the trip cams and the limit switches is covered by a clear plastic cover.

4. A device according to claim 3 with the distinguishing feature that the clear plastic cover has scale markings for measuring the valve lift.

5. A device according to claim 1 with the distinguishing feature that the trip cams are preferably made of red plastic.

6. A device according to claim 1 with the distinguishing feature that the limit switches can either be microswitches or inductive proximity switches.

7. A device according to claim 1 with the distinguishing feature that the limit switches are symmetrically arranged with respect to each other about an axis of said drive spindle and fixed in their position.

8. A device according to claim 1 with the distinguishing feature that a cover and a support form a single unit around a threaded part, which can be turned and locked in place as is necessary to bring said connector into a required position.

* * * * *